United States Patent
Scott et al.

(10) Patent No.: US 8,463,242 B2
(45) Date of Patent: Jun. 11, 2013

(54) COMMUNICATIONS SYSTEM PROVIDING MOBILE DEVICE NOTIFICATION CONTENT TYPE SELECTION FEATURES AND RELATED METHODS

(75) Inventors: Sherryl Lee Lorraine Scott, Toronto (CA); Gaëlle Martin-Cocher, Toronto (CA)

(73) Assignee: Research In Motion Limited, Waterloo, Ontario (CA)

( * ) Notice: Subject to any disclaimer, the term of this patent is extended or adjusted under 35 U.S.C. 154(b) by 705 days.

(21) Appl. No.: 12/394,309

(22) Filed: Feb. 27, 2009

(65) Prior Publication Data

US 2010/0222027 A1    Sep. 2, 2010

(51) Int. Cl.
*H04W 4/00*    (2009.01)
(52) U.S. Cl.
USPC ............... 455/412.2; 455/414.1; 709/206
(58) Field of Classification Search
USPC ............ 455/412.2, 414.1, 567, 461; 709/206, 709/229
See application file for complete search history.

(56) References Cited

U.S. PATENT DOCUMENTS

| | | | |
|---|---|---|---|
| 6,208,996 B1 * | 3/2001 | Ben-Shachar et al. ............... 1/1 |
| 6,470,181 B1 | 10/2002 | Maxwell ....................... 455/413 |
| 6,618,763 B1 | 9/2003 | Steinberg ...................... 709/246 |
| 6,751,657 B1 * | 6/2004 | Zothner ......................... 709/220 |
| 6,763,384 B1 * | 7/2004 | Gupta et al. ................... 709/224 |
| 6,775,658 B1 * | 8/2004 | Zothner ........................... 706/47 |
| 6,874,018 B2 | 3/2005 | Wu ................................ 709/219 |
| 7,249,159 B1 | 7/2007 | Horvitz et al. ................. 706/206 |
| 7,251,478 B2 | 7/2007 | Cortegiano ................ 455/412.1 |
| 7,539,747 B2 * | 5/2009 | Lucovsky et al. ............. 709/224 |
| 2002/0065761 A1 | 5/2002 | Fischer et al. |
| 2004/0003048 A1 * | 1/2004 | Stillman et al. ................ 709/207 |
| 2004/0132438 A1 * | 7/2004 | White ............................ 455/418 |
| 2004/0203643 A1 * | 10/2004 | Bhogal et al. .............. 455/414.1 |
| 2004/0203644 A1 * | 10/2004 | Anders et al. .............. 455/414.1 |
| 2005/0043037 A1 * | 2/2005 | Ioppe et al. ................. 455/456.1 |
| 2005/0055433 A1 * | 3/2005 | Mathew et al. ............... 709/223 |
| 2005/0135240 A1 * | 6/2005 | Ozugur .......................... 370/229 |
| 2006/0031340 A1 * | 2/2006 | Mathew et al. ............... 709/206 |
| 2006/0217110 A1 | 9/2006 | Othmer |
| 2006/0251229 A1 * | 11/2006 | Gorti et al. ............... 379/142.02 |
| 2006/0282312 A1 * | 12/2006 | Carlson et al. .................. 705/14 |
| 2007/0088821 A1 | 4/2007 | Sankuratripati et al. |
| 2008/0010301 A1 * | 1/2008 | Tian et al. ........................ 707/10 |
| 2008/0065652 A1 * | 3/2008 | McCann et al. .............. 707/100 |
| 2008/0090513 A1 * | 4/2008 | Collins et al. ................ 455/3.01 |

(Continued)

OTHER PUBLICATIONS

*Mobile Advertising Requirements*, Draft Version 1.0, Jun. 28, 2008, Open Mobile Alliance Ltd.

(Continued)

*Primary Examiner* — Kamran Afshar
*Assistant Examiner* — Mong-Thuy Tran
(74) *Attorney, Agent, or Firm* — Allen, Dyer, Doppelt, Milbrath & Gilchrist, P.A.

(57) ABSTRACT

A communications system may include at least one mobile wireless communications device for storing a plurality of notification preferences scheduled for respective different time periods. The notification preferences may be associated with different types of notification content. Further, a notification server may communicate with the at least one mobile wireless communications device via a wireless communications network for determining a scheduled one of the notification preferences, and sending to the at least one mobile wireless communications device notifications including the corresponding type of notification content based on the scheduled one of the notification preferences.

16 Claims, 5 Drawing Sheets

U.S. PATENT DOCUMENTS

| | | | |
|---|---|---|---|
| 2008/0091494 A1* | 4/2008 | Betancourt et al. | 705/8 |
| 2008/0098297 A1* | 4/2008 | Sun et al. | 715/234 |
| 2008/0126360 A1* | 5/2008 | Kakuta et al. | 707/10 |
| 2008/0133645 A1* | 6/2008 | Fridman et al. | 709/202 |
| 2008/0153463 A1* | 6/2008 | Morris | 455/412.2 |
| 2008/0240384 A1* | 10/2008 | Suryanarayana et al. | 379/88.21 |
| 2008/0313329 A1* | 12/2008 | Wang et al. | 709/224 |
| 2009/0307349 A1* | 12/2009 | Harris et al. | 709/224 |
| 2010/0088365 A1* | 4/2010 | Varney | 709/203 |

OTHER PUBLICATIONS

*Genuine VC*, David Biesel's Perspective on Digital Change, Apr. 6, 2006, available at www.genuinevc.com/archives.

* cited by examiner

COMMUNICATIONS SYSTEM PROVIDING MOBILE DEVICE NOTIFICATION CONTENT TYPE SELECTION FEATURES AND RELATED METHODS

TECHNICAL FIELD

The present disclosure relates to the field of communications systems, and, more particularly, to wireless communications systems, devices and related methods.

BACKGROUND

Cellular communications systems continue to grow in popularity and have become an integral part of both personal and business communications. Cellular telephones allow users to place and receive voice calls most anywhere they travel. Moreover, as cellular telephone technology has increased, so too has the functionality of cellular devices and the different types of devices available to users. For example, many cellular devices now incorporate personal digital assistant (PDA) features such as calendars, address books, task lists, etc. Moreover, such multi-function devices may also allow users to wirelessly send and receive electronic mail (email) messages and access the Internet via a cellular network and/or a wireless local area network (WLAN), for example.

As a result, users continue to spend more time using their mobile devices during the course of a day, as opposed to early cellular phones that were used only for phones calls. This has resulted in a significant interest from the advertising community in targeting advertisements to mobile devices.

One exemplary system for providing advertising to a handheld computer is disclosed in U.S. Pat. No. 6,874,018 to Wu. The handheld computer includes a screen for displaying visual content received from a network and configured for playing an audio message associated with the visual content. A request for content from the handheld computer is received, and an advertisement is associated with the request for content. The requested content is sent to the handheld computer for display on the screen of the computer, and the associated advertisement is sent to the computer for playing over an audio output device of the handheld computer.

Despite the advantages of such approaches, further functionality may be desirable in providing notifications, such as advertisements, to mobile wireless communications devices.

DETAILED DESCRIPTION OF THE EMBODIMENTS

The present description is made with reference to the accompanying drawings, in which various exemplary embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Generally speaking, a communications system is disclosed herein which may include at least one mobile wireless communications device for storing a plurality of notification preferences scheduled for respective different time periods. The notification preferences may be associated with different types of notification content. Further, a notification server may communicate with the at least one mobile wireless communications device via a wireless communications network for determining a scheduled one of the notification preferences, and sending to the at least one mobile wireless communications device notifications including the corresponding type of notification content based on the scheduled one of the notification preferences.

In addition, the at least one mobile wireless communications device may be settable to a temporary override mode to receive notifications including a given type of notification content outside of the respective time period therefor. In one embodiment, the at least one mobile wireless communications device may detect a connection to a local network and enter the override mode based thereon. By way of example, the local network may be a virtual private network (VPN).

At least one of the notification preferences may be a work preference corresponding to work-related notification content, for example. Also by way of example, at least one of the notification preferences may be a non-work preference corresponding to non-work-related notification content. The notification content may include advertisements, for example. Furthermore, the at least one mobile wireless communications device may permit user selection of notification preferences and scheduling thereof. By way of example, the at least one mobile wireless communications device may permit scheduling of time of day notification preferences.

In some embodiments, the at least one mobile wireless communications device may be at least one mobile cellular communications device. The at least one mobile wireless communications device may include a user input device and a processor cooperating with the user input device and the display for selecting the notification preferences.

A related mobile wireless communications device, such as the one described briefly above, and communications method are also provided. The method may include storing a plurality of notification preferences scheduled for respective different time periods, where the notification preferences are associated with different types of notification content. The method may further include using a notification server to communicate with the at least one mobile wireless communications device via a wireless communications network for determining a scheduled one of the notification preferences, and sending to the at least one mobile wireless communications device notifications including the corresponding type of notification content based upon the scheduled one of the notification preferences.

Figure 1:
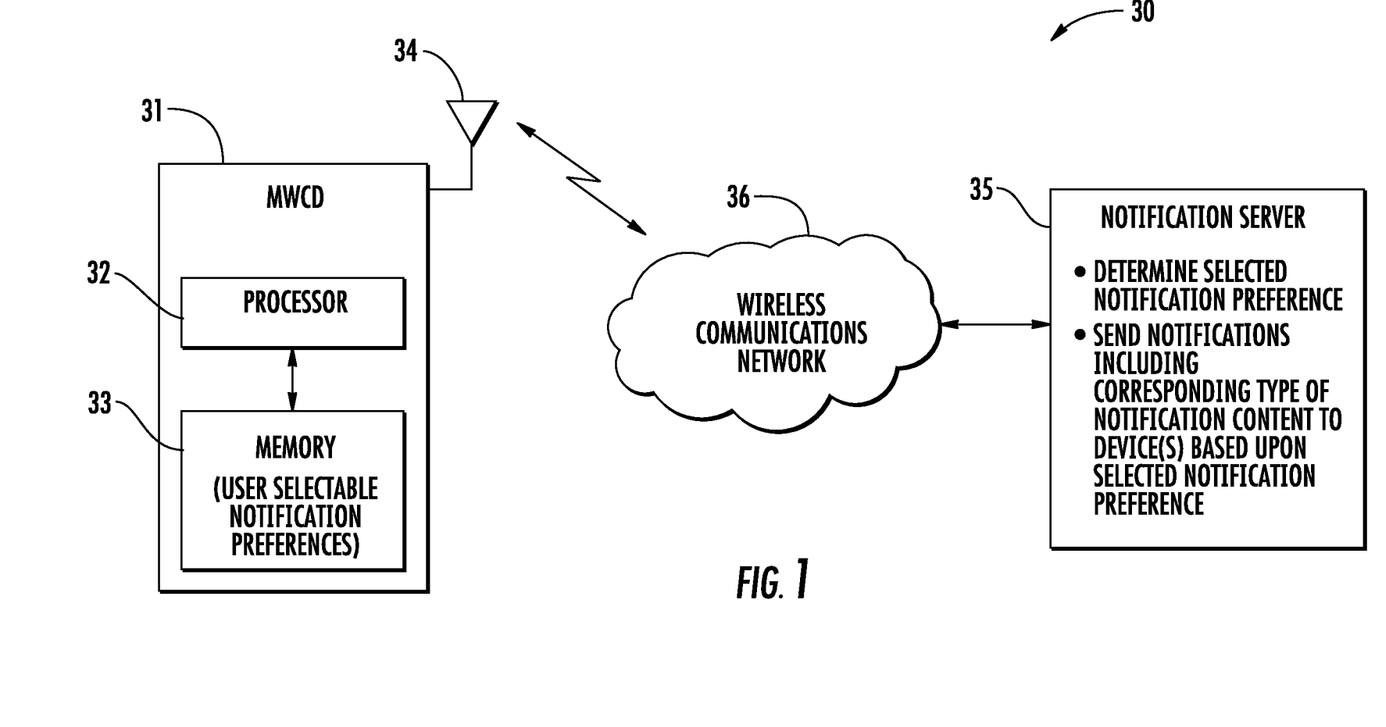
FIG. 1 is a schematic block diagram of a communications system in accordance with one embodiment.

Referring initially to FIG. 1, a communications system 30 illustratively includes one or more mobile wireless communications devices 31 (MWCDs), a notification server 35, and a wireless communications network 36 through which the device(s) and server communicate. The device 31 illustratively includes a processor 32 (e.g., a microprocessor) and associated memory 33 (e.g., FLASH, removable memory (e.g., SD card), etc.) for storing the notification preferences, which may be user selectable, for example. By way of example, the device 31 and wireless communications network may operate in accordance with a cellular, wireless LAN (e.g., 802.11x, Bluetooth, etc.), WiMAX, satellite, etc., communications format, as will be appreciated by those skilled in the art. In some embodiments, more than one such wireless communications format may be used in the same device (e.g., cellular, wireless LAN, and Bluetooth). Moreover, the device 31 also illustratively includes one or more associated antennas 34. Various types of mobile wireless communications devices may be used, such as mobile phones, PDAs, laptop computers, wireless-enabled cameras, wireless-enabled media players, etc., for example.

The device 31 advantageously stores a plurality of notification preferences, which may be user selectable, that are associated with different types of notification content. Such notifications may include notices of upcoming events, special offers, advertisements, etc. In particular, the types of notifications that a given user wants to receive may change from time-to-time. For example, when at work (or during working hours) a user may want to receive notifications relating to their field of work (e.g., notices of upcoming work-related conferences, discounts on office products, etc.). However, this may be different from the notifications the same user would like to receive in the evening, i.e., during non-working hours. By way of example, the user may desire to see non-work-related content such as sports or entertainment notifications during non-working hours. Non-working hours may be still further subdivided into weekday and weekend preferences. For example, a user may desire to receive still different notifications on the weekends, such as notifications of children or family events, for example.

The notification server 35 communicates with the device(s) 31 via the wireless communications network 36 for determining a scheduled one of the notification preferences. That is, the notification server 35 determines which notification preference is currently selected on the device 31. This may be done in different ways. In one embodiment, the server 35 may periodically or intermittently prompt the device 31 to provide this information. Another approach is for the device to provide this information to the notification server 35 at various times, such as upon a change in preference settings by the user. Other examples are to provide the information at a time set by the user, or whenever the user indicates he/she is available to receive ads. Upon determining the selected notification preference, the notification server 35 sends notifications including the corresponding type of notification content to the device 31 based thereon. It will be appreciated that the various functions of the notification server 35 described herein may be implemented by a single computer, or distributed between multiple computing devices.

Figure 2:
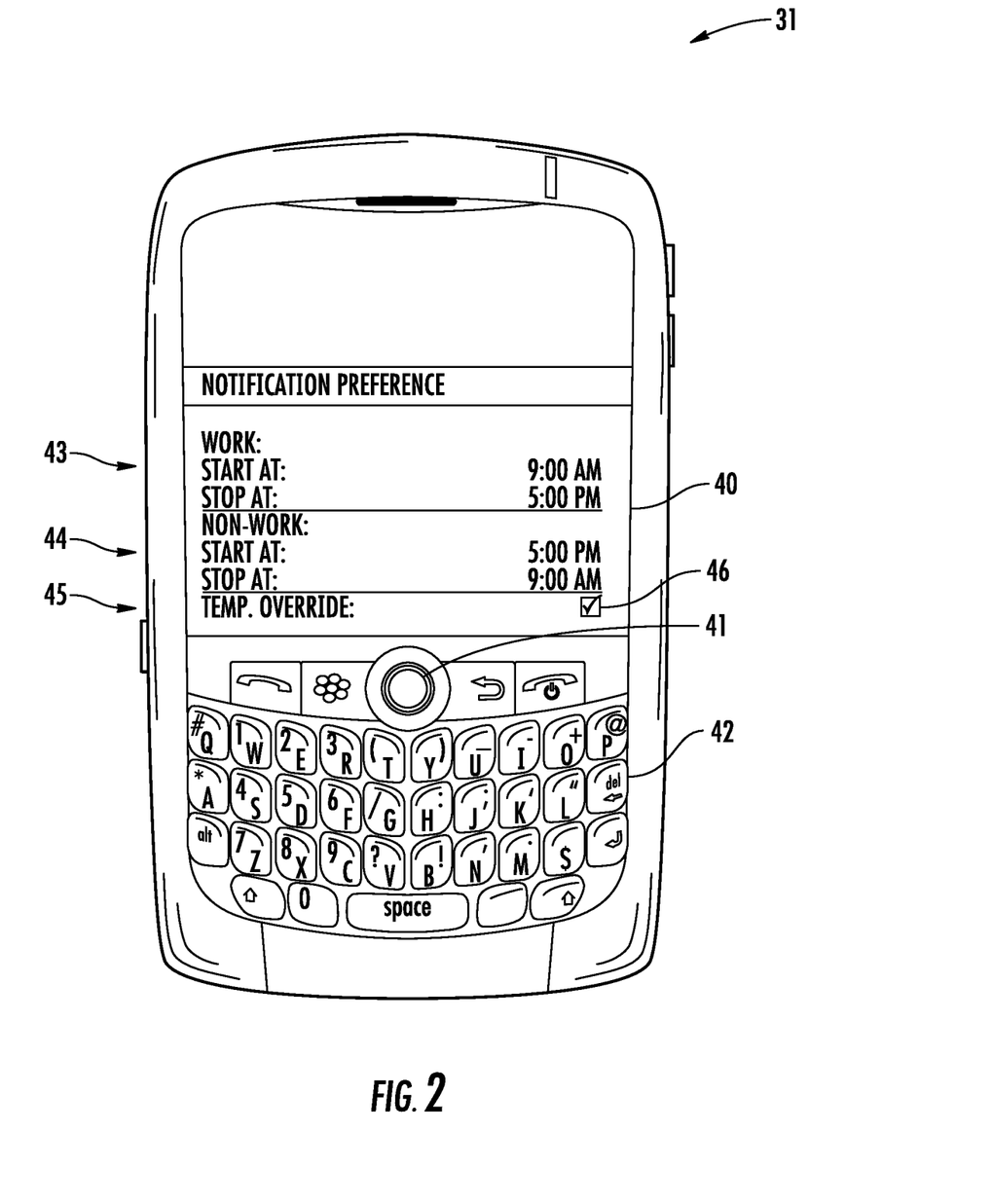
FIG. 2 is a front view of a mobile wireless communications device that may be used in the system of FIG. 1.

Turning more particularly to FIG. 2, the user selectable notification preferences may correspond to respective different time periods, such as working and non-working periods during the day. In the example of FIG. 2, the mobile device 31 is a smart phone with PDA features. The device 31 illustratively includes a display 40 providing a user interface as shown, and one or more user input devices, such as a track ball 41 and a key pad 42, although various other types, combinations, or both, of user input devices may also be used. Here, there are two notification preference, the first being a work preference 43 set to a time period preference of 9:00 AM to 5:00 PM. The second notification preference is a non-work preference 44 set to a time period preference of 5:00 PM to 9:00 AM. Of course, other numbers or types of preferences may be used for different times or different days, or both, such as the weekend preference noted above. Another preference option is to have a reduced or "no notification" time of day, that is, a time when the user does not wish to receive any (or limited) notifications.

The device 31 also illustratively has an override option 45 that is settable to allow a temporary override mode. More particularly, the override mode allows for receiving notifications including a given type of notification content that is outside of the respective time period for that content when an override condition is detected. In the present example, this would allow work notifications to be received if the temporary override option is selected and an override condition is detected during non-work hours, and vice-versa. The override mode also allows for blocking, delaying, or dropping notifications of a given type of content that is within the respective time period for that content when an override condition is detected.

As an example, when an override condition is detected, the device 31 may send a message to the notification server to update which preference (e.g., "work preference" or "non-work preference") the notification server should use. The notification server may then, for example, send notifications related to the "work preference" even though the current time period is for the "non-work preference."

Alternatively, the device 31 may handle the override condition locally by not sending a message to update the notification server and delaying or dropping notifications from the notification server. For example, a user is in a meeting that runs into the non-work preference time period, the device may detect this override condition and enforce the work preference even though the time period is for the non-work preference. Should the server still send notifications related to the non-work preference, the device may delay notifications related to the non-work preference until a later time or drop the notifications related to the non-work preference.

In alternative embodiments, the device may detect an override condition from calendar or personal information manager (PIM) data. As an example, setting a period of time as a holiday or a vacation in a calendaring or PIM application on the device may be detected by the device so that during the holiday or vacation, the device will override the work preference with the non-work preference. As such, notifications related to the work preference can be delayed or dropped automatically during the holiday or vacation and notification related to the non-work preference can be received, even though the time period may be related to the work preference.

FIG. 2 depicts an embodiment wherein the temporary override option is user-selectable through the interface by a check box 46, although buttons or other user interface forms may also be used for this purpose as well, as will be appreciated by the skilled artisan. Optionally, the processor 32 may automatically de-select the override mode after the time period for the current notification type has passed. Another option is that if the override mode is selected, content that may have been sent at that given time could initiate a dialog or queue asking the user to "save content for viewing later", "remind me to view at another time", or a "no I want to take a look and over ride after viewing".

Figure 3:
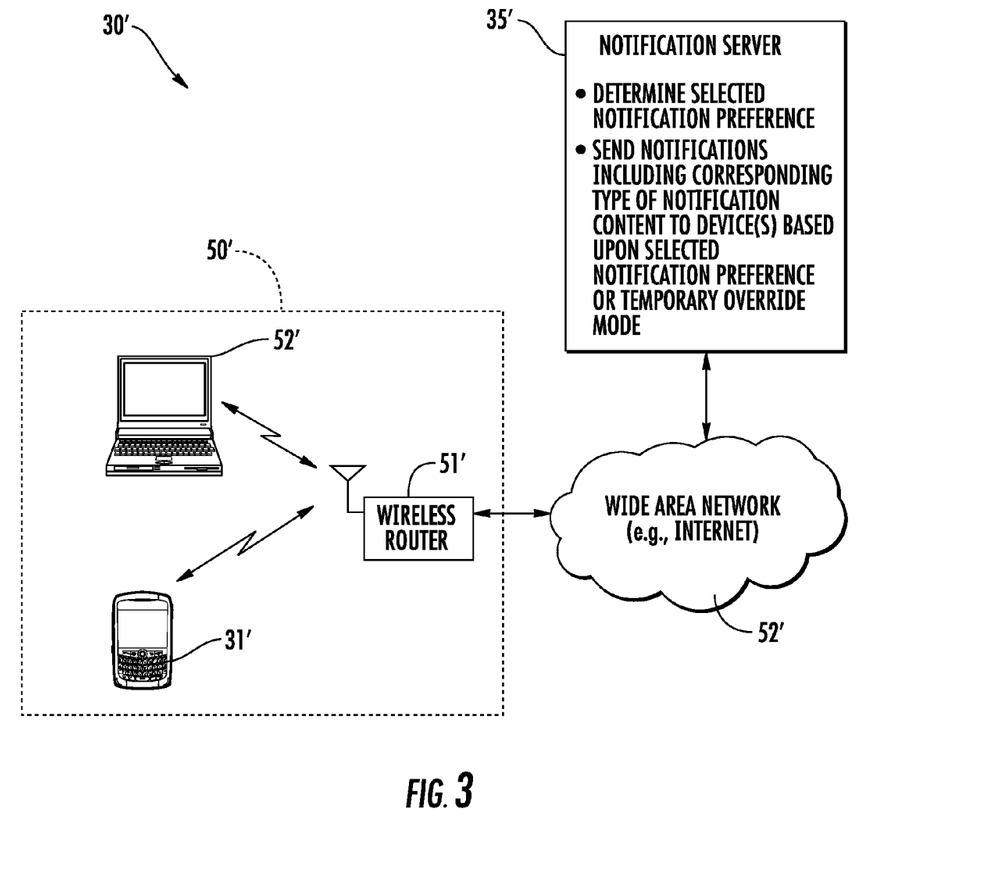
FIG. 3 is a schematic block diagram of alternative embodiment of the system of FIG. 1.

In accordance with an alternative embodiment illustrated in FIG. 3, the device 31' detects a connection to a local network utilizing a virtual private network (VPN) 50' through a wireless router 51', for example. Based upon such a detection, the device processor 32' may cause a particular notification preference to be selected, or an override condition might be satisfied that allows for operation in the temporary override mode if the override option is selected. In this scenario, the notification server 35' may communicate with the device 31' via a wide area network 52', such as the Internet, for example. However, this may also be done via a wireless communications network (e.g., a cellular network). That is, communications through either or both types of networks is possible.

By way of example, if the VPN 50' is at a user's home, then the device 31' may be configured to select the non-work preference upon detection of a connection to the VPN. Alternately, if a user works from home, connection to the VPN 50' may mean that the user wishes to receive work-related notification content, and when the user is away from home (i.e., there is no connection to the VPN), then a different notification preference (e.g., non-work) may be selected. Stated alternatively, the selection of the various notification preference modes need not necessarily be time-based. That is, they may instead (or in addition to) be based upon the user's location (as determined by cellular base station connection, GPS, etc.) or network connection, and the notification server 35' may provide the appropriate notification content accordingly.

In some embodiments, user selection of the notification preference need not require selection of beginning/ending times. For example, the user may be given the option to select a place or mood corresponding to their current "presence," meaning where the user is, what the user is doing, or how the user feels. The ability to set or choose a notification preference in such a manner advantageously allows advertisements or other notifications that are more pertinent to what the user is currently interested in, or what the user may be able to take advantage of based upon his/her location and how he/she feels, for example.

In accordance with one example, a home or social preference selection during the week may result in notifications that include dinner or theater offers. In a "chill" preference, the user may receive a lunch offer, yoga coupon, etc. For a home or active preference on the weekend, the user may receive notification offers for sporting event tickets, skating coupons, etc. Again, because a user may advantageously set or choose notification preferences, the user will advantageously receive ads that are relevant to what he or she is currently doing and his or her needs at appropriate times of the day or night.

In some embodiments, the notification server 35 may account for different locations of the device 31. For example, if the user travels to a different time zone but does not change the time zone preference on the device, the notification sever 35 may determine from a GPS system in the phone, a cellular network, etc., that device 31 is not in its "home" or normal time zone. As such, the notification server 35 may advantageously determine what the actual local time for the device 31 is, and adjust the times that notifications are sent accordingly, as will be appreciated by those skilled in the art.

In some situations, a user may be using the device 31 for a phone call but also wants to receive notifications during the call. For example, the user may be in a situation where he or she may still view a visual notification on screen during a call, such as if a wired or wireless (e.g., Bluetooth) headset or speaker phone is being used. The user may be permitted to indicate to the device 31 a preference to see notifications on the display 40 accordingly. However, if the user is on a call but without the use of a headset or speaker phone, then notifications may be postponed. In accordance with one example, if the user is on a call but without the use of a headset or speaker phone a dialog (or in the case of a phone call an audio queue) may happen may be provided to prompt the user to take or not take an action. In addition to the action indicators or audio queues that may be provided, a message such as "if you take no action the content will play after 5 seconds . . . " may also be a choice so the user can do nothing to simply let the system show/play the content.

The notifications may be visual notifications (i.e., for display on the screen 40), audio notifications (i.e., to be played through one or more device speakers), or both, depending on the given embodiment. In particular, the form of the notification may be determined by a user profile including various accessories the user may be using. For example, if a headset (wired or wireless) is connected to the device 31, then notifications may be provided in an audible fashion (e.g., if the user is not on a call), as this may be the best way of delivering the notification to the user. Also by way of example, if the device 31 is set to a "quiet" mode or profile, then any notification shown or selected may be provided without sound. If an advertiser had intended an advertisement notification to include sound, then the sound may be converted to text. The user may also be provided with a selection option on the display 40 to change back to the audio presentation format. This may be particularly useful in situations such as when directions are needed, in that a user may receive directions by audio while simultaneously being provided a map. Accordingly, the content provided may advantageously correspond to the particular context of use of the device 31 at a given time. Moreover, this may correspond to the particular application(s) being used on the device 31, as will be appreciated by those skilled in the art.

Figure 4:
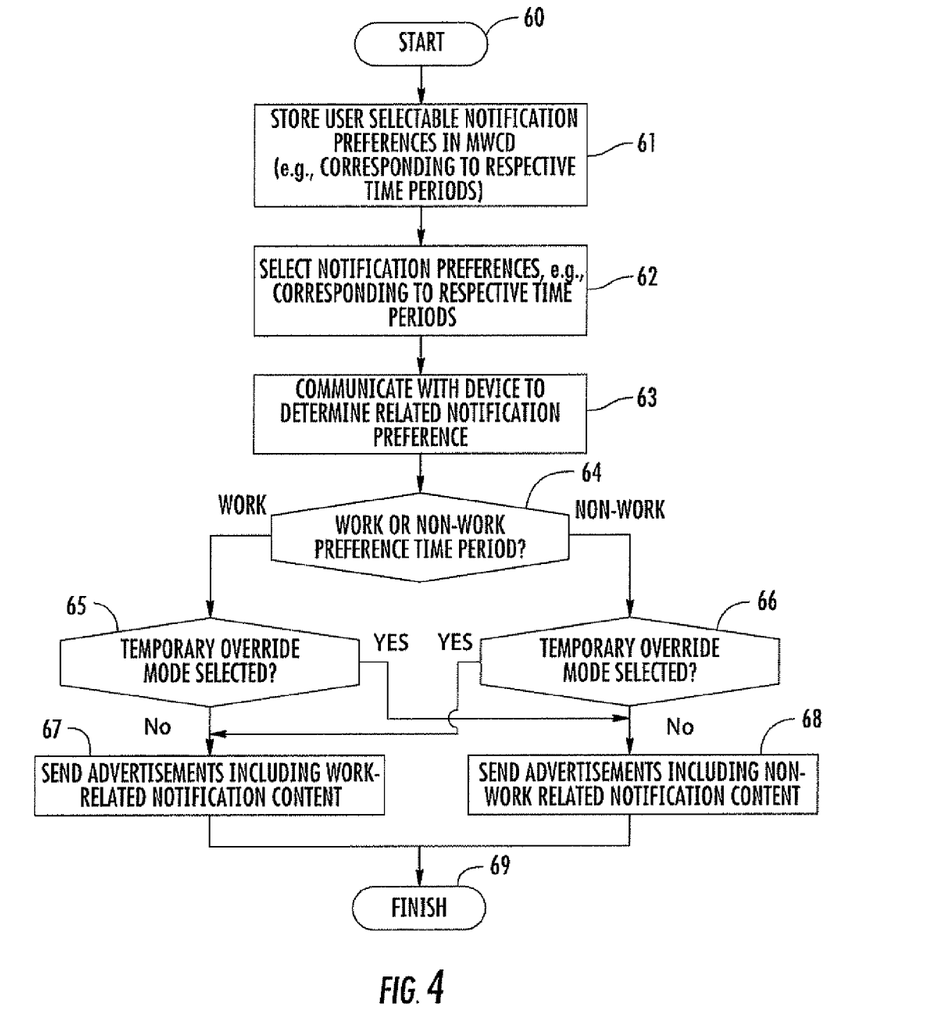
FIG. 4 is a flow diagram of a communications method in accordance with one embodiment.

A related mobile wireless communications method is now described with reference to FIG. 4. Beginning at Block 60, the notification preferences corresponding to different types of notification content are stored in the device(s) 31, at Block 62, and a given notification preference is selected as discussed above (e.g., by setting time periods for work and non-work notifications), at Block 62. The notification server 35 communicates with the device 31 for determining the selected one of the notification preferences (Block 63), as discussed above. Depending upon the current time, selected time period, whether the override option is selected, and whether an override condition is satisfied, at Blocks 64-66, the appropriate type of notification content (e.g., advertisements) is then sent to the device 31, at Block or 67 or 68, thus concluding the illustrated method (Block 69).

Exemplary components of a hand-held mobile wireless communications device 1000 that may be used in accordance the system 20 is further described in the example below with reference to FIG. 5. The device 1000 illustratively includes a housing 1200, a keypad 1400 and an output device 1600. The output device shown is a display 1600, which may comprise a full graphic LCD. In some embodiments, display 1600 may comprise a touch-sensitive input and output device. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400 by the user. In some embodiments, keypad 1400 may comprise a physical keypad or a virtual keypad (e.g., using a touch-sensitive interface) or both.

The housing 1200 may be elongated vertically, or may take on other sizes and shapes (including clamshell housing structures). The keypad 1400 may include a mode selection key, or other hardware or software for switching between text entry and telephony entry.

Figure 5:
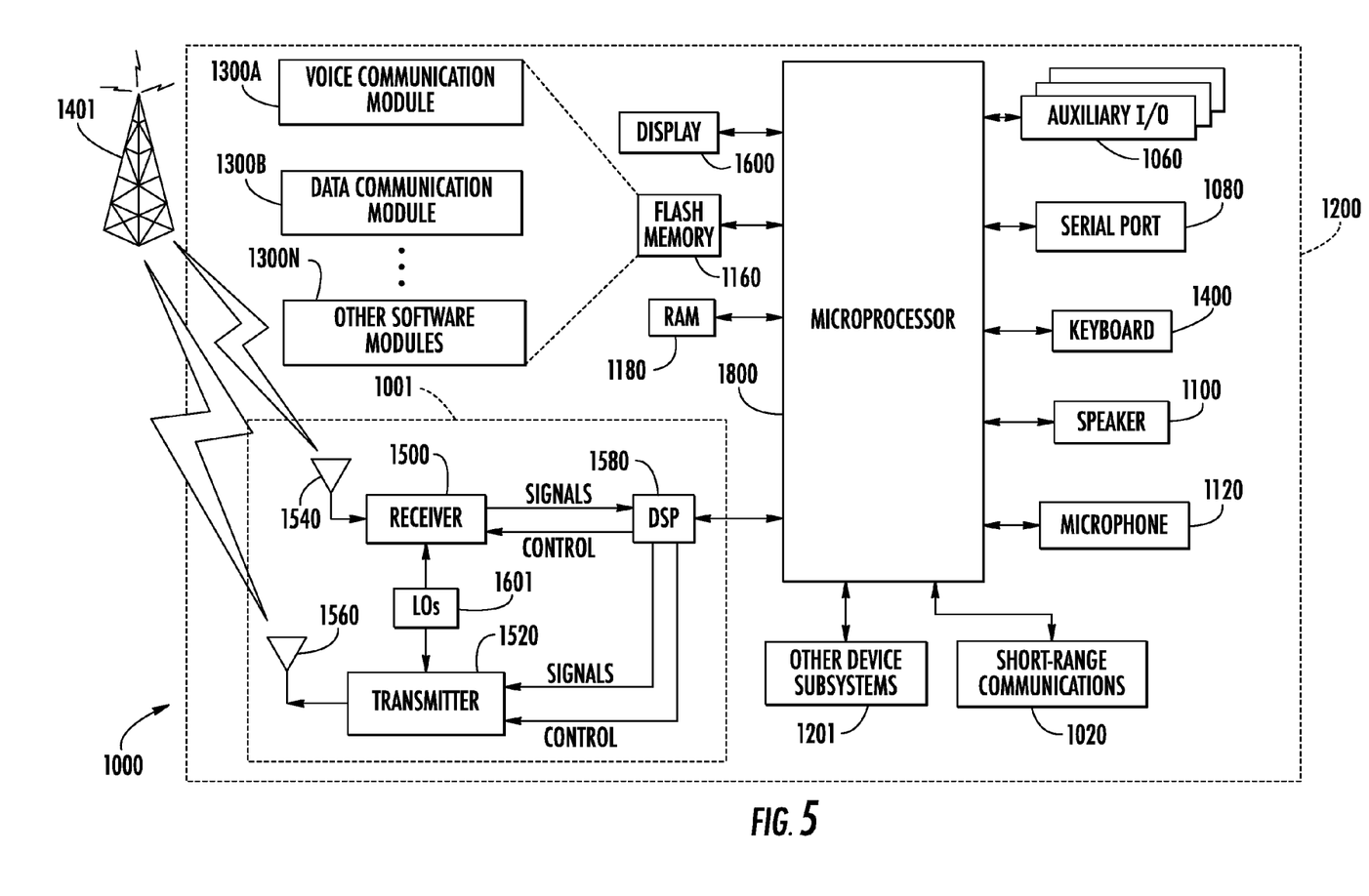
FIG. 5 is a schematic block diagram illustrating exemplary components of a mobile wireless communications device that may be used with the system of FIG. 1.

In addition to the processing device 1800, other parts of the mobile device 1000 are shown schematically in FIG. 5. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having voice and data communications capabilities. In addition, the mobile device 1000 may have the capability to communicate with other computer systems via the Internet.

Operating system software executed by the processing device 1800 may be stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3G, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore utilizes a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control processes implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A mobile wireless communications device comprising:
a wireless transceiver;
a user input device; and
a processor configured to cooperate with said wireless transceiver and said user input device to
set a plurality of notification preferences, each notification preference being scheduled for a time period, and the notification preferences being associated with different types of notification content,
send the plurality of notification content preferences from the mobile wireless communications device to a notification server, receive the notifications from the notification server, the notifications including the corresponding type of notification content based on a respective notification preference and the time period, set an override option on the mobile wireless communications device, detect an override condition by the mobile wireless communications device, send a message to the notification server based upon the override option being set and the override condition being detected, and including an update regarding which notification preference the notification server should use for sending notifications, and receive the notifications from the notification server comprising notification content based on the updated notification preference included in the message.

2. The mobile wireless communications device of claim 1 wherein the notifications are advertisements.

3. The mobile wireless communications device of claim 1 wherein the override option comprises a temporary override option for the respective time period.

4. The mobile wireless communications device of claim 3 wherein the processor is configured to provide for at least one of blocking, delaying and dropping notifications based upon the override option being set and the override condition being detected.

5. The mobile wireless communications device of claim 1 wherein the message also indicates that the override condition was detected.

6. The mobile wireless communications device of claim 1 wherein the override condition is that the mobile wireless communications device is connected to a local area network.

7. The mobile wireless communications device of claim 6 wherein the local area network comprises a virtual private network (VPN).

8. A notification server for communicating with at least one mobile wireless communications device via a wireless communications network, the notification server comprising:

a wireless transceiver; and a processor configured to cooperate with said wireless transceiver to receive a plurality of notification preferences from a mobile wireless communications device, the notification preference being scheduled for a time period, and the notification preferences being associated with different types of notification content, send the notifications to the mobile wireless communications device, the notifications including the corresponding type of notification content based on a respective notification preference and the time period, receive a message from the mobile wireless communications device based upon an override option being set and an override condition being detected at the mobile wireless communications device, and the message including an update regarding which notification preference should be used for sending notifications; and send the notifications comprising notification content based on the updated notification preference included in the message.

9. The notification server of claim 8 wherein the notifications are advertisements.

10. The notification server of claim 8 wherein the override condition is that the mobile wireless communications device is connected to a local area network.

11. The notification server of claim 10 wherein the local area network comprises a virtual private network (VPN).

12. A non-transitory computer-readable storage medium upon which a plurality of instructions are stored, the instructions which when executed by a processor, causes the processor to perform a method for handling notifications performed by a mobile wireless communications device, the method comprising:

setting a plurality of notification preferences at the mobile wireless communications device, each notification preference being scheduled for a time period, and the notification preferences being associated with different types of notification content;

sending the plurality of notification preferences from the mobile wireless communications device to a notification server;

receiving the notifications from the notification server at the mobile wireless communications device, the notifications including the corresponding type of notification content based on a respective notification preference and the time period;

setting an override option on the mobile wireless communications device;

detecting an override condition by the mobile wireless communications device;

sending a message to the notification server based upon the override option being set and the override condition being detected, and including an update regarding which notification preference the notification server should use for sending notifications; and receiving the notifications from the notification server comprising notification content based on the updated notification preference included in the message.

13. The non-transitory computer-readable storage medium of claim 12, wherein the override option comprises a temporary override option for the respective time period.

14. The non-transitory computer-readable storage medium of claim 12, further comprising providing for at least one of blocking, delaying and dropping notifications based upon the override option being set and the override condition being detected.

15. The non-transitory computer-readable storage medium of claim 14 wherein the message also indicates that the override condition was detected.

16. The non-transitory computer-readable storage medium of claim 12 wherein the notifications are advertisements.

* * * * *